Apr. 10, 1923.

N. CORNFIELD

VEHICLE WHEEL

Filed Oct. 11, 1920

INVENTOR.
Noah Cornfield
BY
Whittemore Hulbert & Whittemore
ATTORNEYS

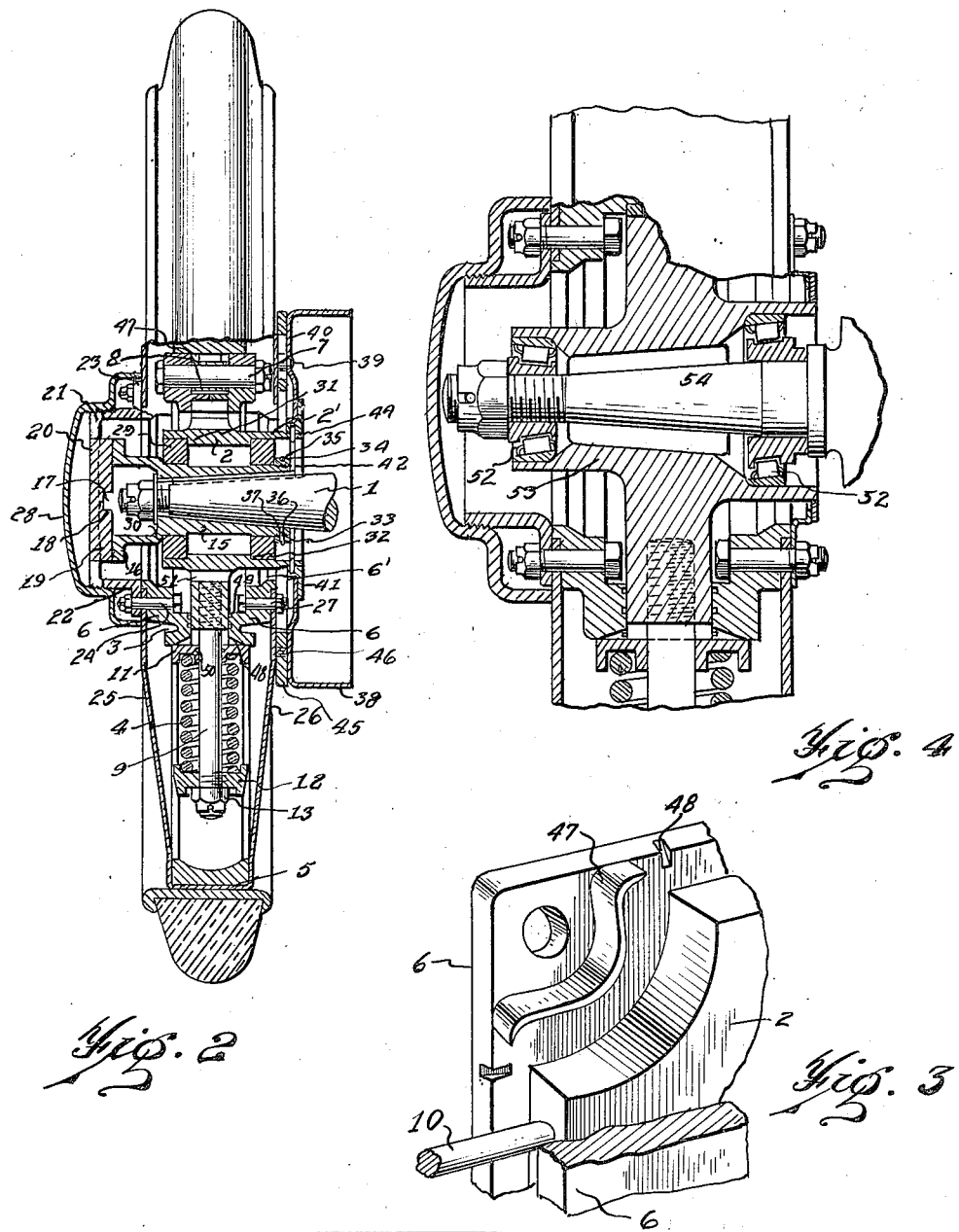

Patented Apr. 10, 1923.

1,451,252

UNITED STATES PATENT OFFICE.

NOAH CORNFIELD, OF DETROIT, MICHIGAN, ASSIGNOR TO ACME CUSHION WHEEL COMPANY, OF WILMINGTON, DELAWARE, A CORPORATION OF DELAWARE.

VEHICLE WHEEL.

Application filed October 11, 1920. Serial No. 416,133.

*To all whom it may concern:*

Be it known that I, NOAH CORNFIELD, a citizen of the United States of America, residing at Detroit, in the county of Wayne and State of Michigan, have invented certain new and useful Improvements in Vehicle Wheels, of which the following is a specification, reference being had therein to the accompanying drawings.

The invention relates to vehicle wheels and has particular reference to wheels provided with yieldable means for taking care of the stresses. The invention has for one of its objects the provision of a simple construction in which the load is suspended from the rim and by means of yieldable members under compression which rotate with the rim. Another object of the invention is the provision of means for positively lubricating the bearing surface of the means supporting the yieldable members and connected to the rim. Other objects of the invention reside in the novel features of construction and combinations and arrangements of parts as more fully hereinafter set forth.

In the drawings:

Figure 2 is a cross section on the line 2—2 thereof;

Figure 3 is a perspective view of a corner portion of the device for supporting the yieldable members and the spider block when assembled;

Figure 4 is a central cross section through a portion of a wheel of modified construction;

Figures 1, 5, 6:
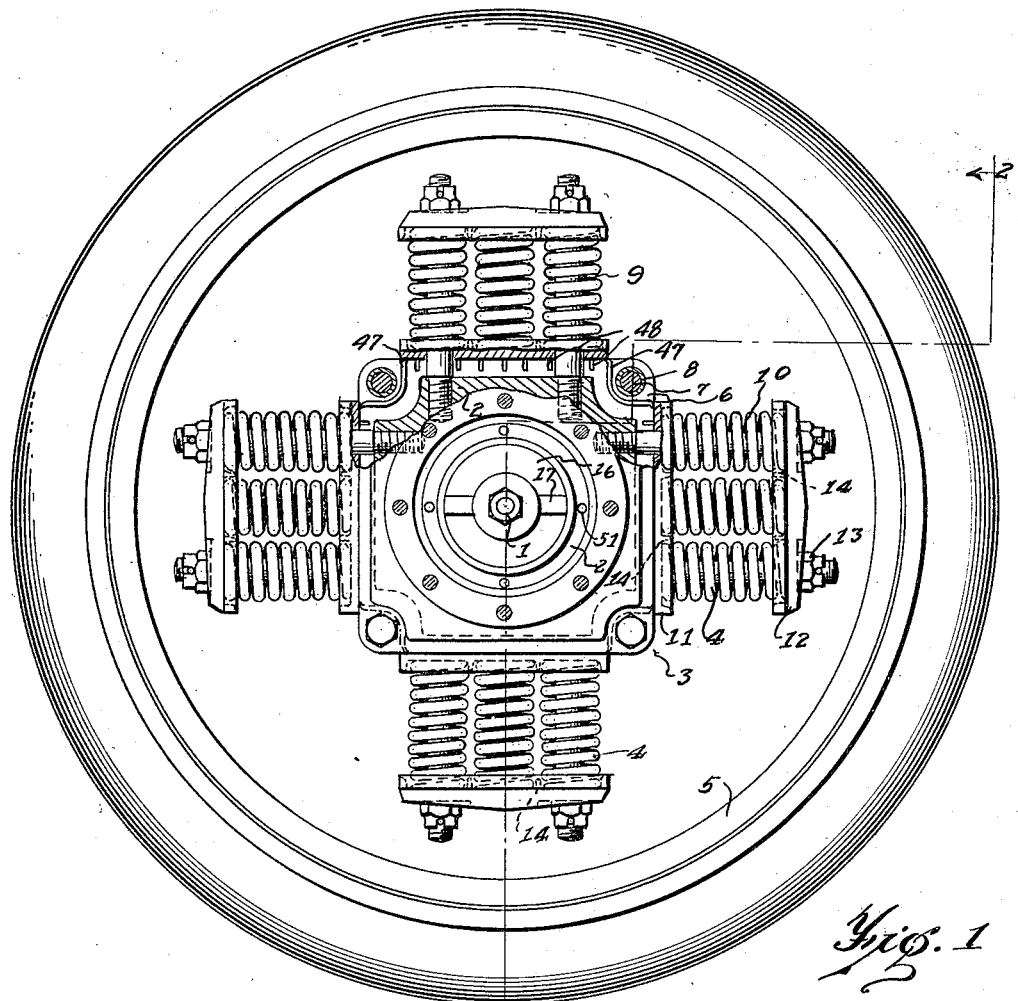
Figure 1 is a side elevation partly in section with a side disk removed, of a vehicle wheel embodying my invention.
Figures 5 and 6 are details.

As shown in Figures 1 and 2, 1 is the spindle of a drive axle, 2 the spider block mounted upon the spindle, and 3 the device for supporting the coil springs 4 from the wheel rim 5. The support 3 comprises the spaced parallel polygonal plate 6 having the central apertures 6' therethrough and secured to each other at their corners by means of the bolts 7 and held in spaced relation by the spacers 8 sleeved upon the bolts. The spider block is polygonal and has a hub portion 2' extending through the apertures of the plates and spaced sufficiently from the aperture walls to permit of all necessary relative movement of the block and plates. The portion of the block extending outwardly from the hub portion has a sliding fit between the plates. 9 and 10 are, respectively, vertical and horizontal arms extending outward from the peripheral faces of the spider block, and in the present instance are formed of studs threadedly engaging the spider block. 11 and 12 are, respectively, inner and outer abutments for the coil springs 4, sleeved upon the arms 9 and 10, the inner abutments having sliding engagement with the peripheral faces of the plates 6, while the outer abutments are secured to the arms by means of the nuts 13. In the present instance, there are a pair of arms extending outward from each peripheral face of the spider block and there are three coil springs at each side, the outer two of which surround the arms, while the intermediate spring engages the abutments and is held from side movement by means of the annular flanges 14 upon the abutments.

For the purpose of driving the wheel from the spindle 1, a suitable universal drive device is provided between the spindle and the support and rim. In detail, 15 is a sleeve keyed upon the spindle 1 and having the enlargement 16 extending outwardly beyond the outer end of the spindle and provided with the diametrical projections 17 engaging in diametrical slots 18 in the intermediate member 19 of the universal joint. This intermediate member has the projection 20 extending transversely of the diametrical slots 18 and upon its opposite face for engaging in the slot 21 of the hub cap 22, which latter has the outwardly extending annular flange 23 secured to the outer plate 6 of the support 3 by means of the bolts 24. These bolts also secure the outer side disk 25 of the wheel which connects the outer plate 6 to the wheel rim. 26 is the inner side disk of the wheel which connects the inner plate 6 of the support to the rim, and this disk is secured to the inner plate by means of the bolts 27. 28 is an auxiliary hub cap threadedly engaging the hub cap 22 and with the outer side disk 25 closing the outer side of the wheel.

The spider block 2 is held in spaced concentric relation to the sleeve 15 by means of the annular spacers 29, the outer one of which is held in position by means of an annular shoulder 30 upon the enlargement 16 of the sleeve, and the annular shoulder 31 upon the hub portion 2' of the spider block 2. The inner annular spacer is held in position by means of the annular shoulder 32 upon the hub portion 2' of the spacer block and the nut 33 threadedly engaging the inner end of the sleeve 15 and locked in position by means of the annular wire member 34 preferably formed of spring steel and engaging the annular groove 35 in the outer face of the nut, this wire member having a radial portion 36 extending through the nut and into the bore 37 near the inner end of the sleeve 15.

38 is a brake drum secured to the rear of the vehicle wheel as by means of the rivets 39 securing the inwardly extending flange 40 of the brake drum to the inner side disk of the wheel. This flange has the central opening therethrough of greater diameter than that of the hub portion 2' of the bearing block, and for closing the space therebetween and holding the inner part of the flange in place, there is a bushing 41 sleeved upon the hub portion of the spider block and engaging the outer face of the flange 40. For locking this bushing in place, the U-shaped wire member 42 is provided having the outwardly extending end portions 43 which are adapted to extend through apertures 44 in the hub portion 2' of the spider block and engage in apertures in the bushing. For sealing the joint between the inner side disk 26, and the flange 40 of the brake drum, there is a plate 45 in which suitable packing 46 is arranged.

In operation, the load upon the axle is suspended from the wheel rim by means of the sleeve 15, the annular spacers 29, the spider block 2, upper vertical arms 9, outer abutment 12, coil springs 14, inner abutment 11, plates 6 of the support 3, and side disks 25 and 26 of the wheel. The other stresses incident to the motion of the vehicle are correspondingly taken care of by the other coil springs. Rotation of the spindle rotates the side disks of the wheel and also the plates of the spring support which plates in turn rotate the spider block by means of the inner abutments frictionally held in engagement with the peripheral surfaces of the plates and the arms extending outward from the spider block and upon which the inner abutments are sleeved. The arrangement is such that rotation of the spider block from the spring support does not produce any torsional or bending effect upon the springs and consequently they are free to contract and expand depending upon the stresses to which they are subjected. Furthermore, any side thrust occurring in the wheel is taken care of by the spider block engaging between the plates of the spring support.

For the purpose of positively lubricating the peripheral bearing faces of the support 3, use is made of the relative movement of the spider block 2 and plates 6 of the spring support. In detail, the space between the plates 6 and within the adjacent inner spring abutments 11 is closed by means of the inwardly extending flanges 47 at the corners of the plates, which flanges abut each other and overlap, at their adjacent ends, the inner spring abutments. The grooves or channels 48 are provided in the outer or peripheral faces of the plates 6 terminating inside the outer sides of the inner spring abutments, and the outer or peripheral faces of the spider block are located inside those of the plates, so that the spider block acts as a plunger to force lubricant through the grooves or channels upon the peripheral faces of the plates, which is spread thereover due to the sliding of the inner spring abutments thereon. The lubricant enters the space between the plates 6 and between the peripheral faces of the spider block 2 and the inner spring abutments 11 and corner closures 47 when the hub is being filled and also when the wheel is rotating by passing between the faces of the spider block and plates, which latter have a sliding fit. To permit the lubricant to more readily pass between the spider block and support plates, the latter have the annular grooves 49 in their inner bearing faces. To prevent escape of the lubricant around the arms 9 and 10, suitable packing 50 is provided in the inner spring abutments and to equalize the pressures of the lubricant on both the inner and outer sides of the spider block, the latter is provided with transversely extending apertures 51.

Thus it will be readily seen that I have provided means for positively lubricating the bearing surfaces of the device for supporting the coil springs from the wheel rim. Furthermore, the lubricant assists in absorbing any shocks, since it must be displaced before movement of the spider block relative to the support, can take place.

In the modified construction shown in Figure 4, the wheel is adapted for use upon the front axle particularly, and consequently is not positively rotated. In this construction, friction bearings 52 are provided between the spider block 53 and the spindle 54, the coil springs rotating with the wheel rim and functioning in the same manner as those shown in Figures 1 and 2.

What I claim as my invention is:

1. The combination with a driven spindle, of a wheel, comprising a rim, coil springs within said rim and rotatable therewith, a support fixedly secured to said rim, a spider block upon said driven spindle and slidably engaging said support, said spider block having arms surrounded by said coil springs, abutments at the outer ends of said coil springs sleeved upon said arms, and abutments at the inner ends of said coil springs sleeved upon said arms and slidably engaging the periphery of said support.

2. The combination with a driven spindle, of a wheel, comprising a rim, coil springs within said rim and rotatable therewith, a support member fixedly secured to said rim, a block member upon said driven spindle and slidably engaging said support member, arms extending outwardly from the faces of said block member, abutments at the outer ends of said coil springs sleeved upon said arms, abutments at the inner ends of said coil springs sleeved upon said arms and slidably engaging the periphery of said support member, and means for driving one of said members from said driven spindle, the other of said members being driven thereby through said inner abutments and arms.

3. In a vehicle wheel, the combination with a rim, of yieldable members within said rim, a support for the inner ends of said yieldable members, said yieldable members being slidably mounted upon said support, and means controlled by the expansion and contraction of said yieldable members for lubricating the bearing surface of said support.

4. The combination with a spindle, of a wheel comprising a rim, yieldable members within said rim, a support having a bearing surface for carrying the inner ends of said yieldable members, said support being carried from said rim, a block upon said spindle connected to the outer ends of said yieldable members, and means for positively lubricating the bearing surface of said support.

5. The combination with a spindle, of a wheel, comprising a rim, yieldable members within said rim and rotatable therewith, a support for the inner ends of said yieldable members connected to said rim, a block upon said spindle and slidably engaging in said support, arms upon said block, abutments for the outer ends of said yieldable members upon said arms, abutments for the inner ends of said yieldable members upon said arms and slidably engaging said support, and means for lubricating the bearing surface of said support, upon relative movement of said support and block.

6. The combination with a spindle, of a wheel, comprising a rim, springs within said rim and rotatable therewith, a pair of spaced polygonal members for supporting the inner ends of said springs, said polygonal members being carried from said rim, a corresponding polygonal block upon said spindle and slidably engaging between said members, the peripheral faces of said block terminating inside the peripheral faces of said members, abutments for the inner ends of the springs slidably engaging the corresponding peripheral faces of said members, abutments for the outer ends of the springs, connected to said block, and means for closing the space between the members at their corners, whereby said corner closing means with said abutments for the inner ends of the springs completely close the space between the polygonal members near their peripheral faces to form a lubricant container.

7. The combination with a spindle, of a wheel, comprising a rim, coil springs within said rim and rotatable therewith, a pair of spaced polygonal members for supporting the inner ends of said springs, said members being carried from said rim, a corresponding polygonal block upon said spindle and slidably engaging between said members, the peripheral faces of said block terminating inside the peripheral faces of said members, arms extending outward from the peripheral faces of said block, abutments for the inner ends of said coil springs sleeved upon said arms, said abutments slidably engaging the corresponding peripheral faces of said members, abutments for the outer ends of said coil springs, sleeved upon said arms, grooves in the peripheral faces of said members, and means upon said members and over-lapping said abutments for the inner end of the springs for closing the space at the corners of said members.

8. The combination with a spindle, of a wheel, comprising a rim, yieldable members within said rim, a sectional support intermediate said rim and spindle and operably connected to the inner ends of said yieldable members, said yieldable members being slidably mounted upon said support, said support being fixedly secured to said rim, a spider intermediate said spindle and rim and operably connected to the outer ends of said yieldable members, said spider having a sliding engagement with said support sections.

9. The combination with a spindle, of a wheel comprising a rim, springs within said rim and rotatable therewith, a pair of spaced supporting members for the inner ends of said springs, said members being connected to said rim, a block upon said spindle slidably engaging between said members, the peripheral faces of said block terminating inside the peripheral faces of said members, abutments for the inner ends of the springs slidably engaging the corresponding peripheral faces of said members, abutments for the outer end of the springs connected to said block, and means for closing the space between the members at their corners, whereby said corner closing means with said abutments for the inner ends of the springs completely close the space between the members near their peripheral faces to form a lubricant container.

10. The combination with a spindle, of a wheel comprising a rim, yieldable members within said rim and rotatable therewith, a sectional support having a bearing surface and carrying the inner ends of said yieldable members, said support being connected to said rim, a block upon said spindle and engaging said support sections, arms upon said block, abutments for the outer ends of said yieldable members upon said arms, abutments for the inner ends of said yieldable members upon said arms and engaging said support, and means for lubricating the bearing surface of said support upon relative movement of said support and block.

11. The combination with a spindle, of a wheel comprising a rim, yieldable members within said rim, a sectional support having a bearing surface and carrying said yieldable members, said support being carried from said rim, a block upon said spindle connected to said yieldable members, and means for lubricating the bearing surface of said support upon relative movement of said block and said support.

12. The combination with a spindle, of a wheel comprising a rim, yieldable means within said rim, a sectional support intermediate said rim and spindle and operably connected to said yieldable means, said support being fixedly secured to said rim, a spider intermediate said spindle and rim and operably connected to said yieldable means, said spider having a sliding engagement with said support sections.

13. The combination with a spindle, of a wheel comprising a rim, a polygonal support intermediate said rim and spindle, said support being fixedly secured to said rim, a spider block mounted on said spindle and having a sliding engagement with said support, and yieldable means within said rim, said yieldable means being operably connected to said spider block and slidably mounted upon said support.

14. The combination with an axle, of a wheel comprising a rim, a spider block non-rotatably mounted upon said axle, yieldable members within said rim, a sectional support engaging opposite sides of said block and connected to said rim, abutments for the inner ends of said yieldable members slidably mounted upon said support, and abutments for the outer ends of said yieldable members secured to said spider block.

15. The combination with a rim, of a spider block having a hub portion and outwardly extending arms, yieldable members secured to said spider block, abutments for the inner ends of said yieldable members, a support for said abutments, the support being carried by the rim and having spaced bearing surfaces for the abutments, and means upon said arms for positively lubricating the bearing surfaces of said support.

16. The combination with an axle, of a wheel, comprising a rim, a spider block mounted upon said axle having a hub portion and outwardly extending arms, support plates upon opposite sides of said arms and having central apertures surrounding and spaced from said hub portion, yieldable members, inner abutments for said yieldable members slidably engaging said support plates and engaging said arms, outer abutments for said yieldable members secured to said arms and means upon said arms for forcing lubricant between the bearing surfaces of said support plates and inner abutments.

17. The combination with a rim, of a spider block having a hub portion containing a lubricant, yieldable members secured to said spider block, abutments for the inner ends of said yieldable members, support plates having bearing surfaces for said abutments and carried by said rim, and means for forcing the lubricant from the hub portion of said block to the bearing surfaces of said plates.

18. The combination with a rim, of a spider block having a hub portion and a plurality of arms extending therefrom, yieldable members located within said rim, a support engaging said spider block and having bearing surfaces, abutments for the inner ends of said yieldable members engaging the bearing surfaces of said support, abutments for the outer ends of said yieldable members engaging said arms, and means upon said arms and positively lubricating the bearing surfaces of said support.

19. The combination with a rim, of a spider block having a hub portion and a plurality of arms extending therefrom, yieldable members located within said rim, a support engaging said spider block and having bearing surfaces, abutments for the inner ends of said yieldable members engaging the bearing surfaces of said support, abutments for the outer ends of said yieldable members engaging said arms, and means positively lubricating the bearing surfaces of said support upon movement of said spider block relative to said support.

In testimony whereof I affix my signature.

NOAH CORNFIELD.